March 25, 1924.
M. C. HOSKIN
VALVE
Filed Aug. 22, 1921
1,488,391
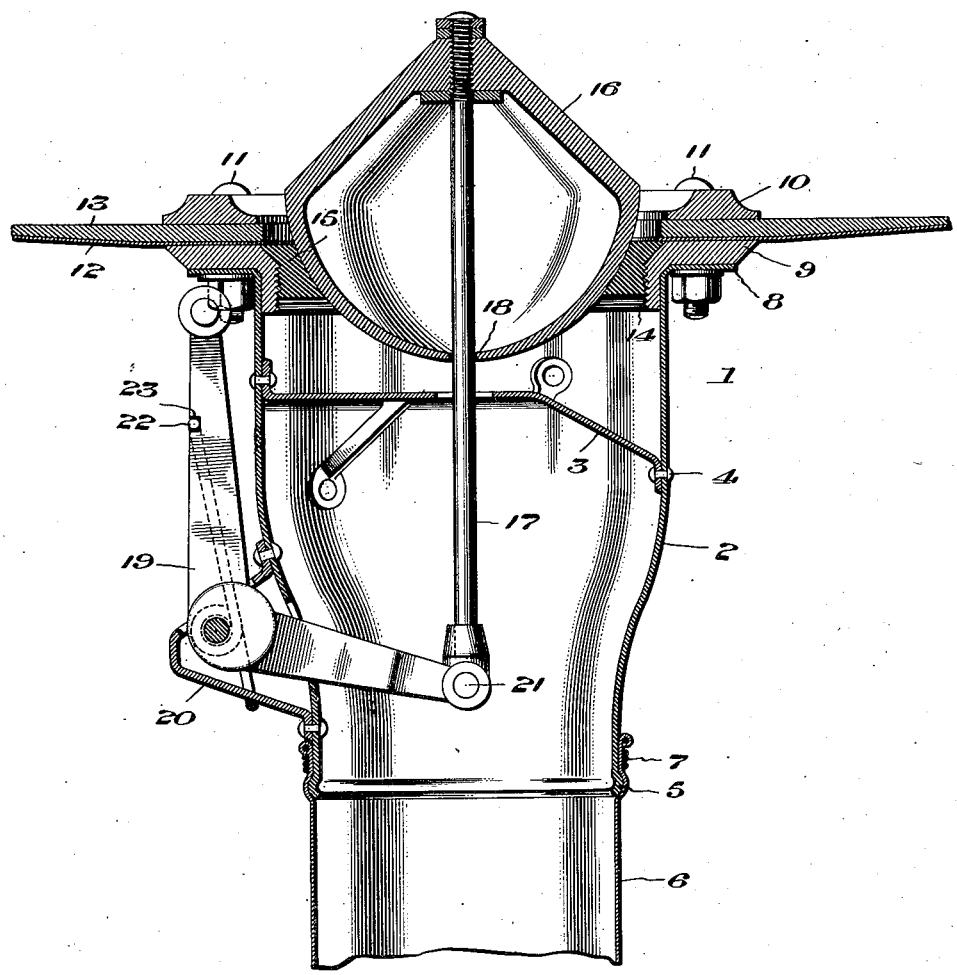
Inventor
M. C. Hoskin Patented Mar. 25, 1924.

1,488,391

UNITED STATES PATENT OFFICE.

MINARD C. HOSKIN, OF AKRON, OHIO, ASSIGNOR TO THE GOODYEAR TIRE & RUBBER COMPANY, OF AKRON, OHIO, A CORPORATION OF OHIO.

VALVE.

Application filed August 22, 1921. Serial No. 494,383.

*To all whom it may concern:*

Be it known that I, MINARD C. HOSKIN, a citizen of the United States, residing at Akron, in the county of Summit and State of Ohio, have invented new and useful Improvements in Valves, of which the following is a specification.

My invention relates to valves and more particularly to water ballast valves, such as are utilized in airships and it has, for its primary object, the provision of a valve which shall be exceptionally effective in operation and which shall not be affected by the corrosive action of the liquid which it is designed to control.

Various objects and advantages of my invention will be apparent from the following detailed description of the accompanying drawing, in the single figure of which a valve is shown in a cross sectional view, which embodies the features of construction of my invention.

In practicing my invention, a water ballast valve may be constructed by utilizing an exhaust tube or valve body portion, formed of any suitable material, to which a plurality of annular members may be secured that are adapted to firmly clamp between them the walls of an opening provided in a container, such as a water ballast tank of an airship.

One of the annular members is provided with an interiorly threaded surface into which a hard rubber seat is fitted and is adapted to be engaged by a valve head, preferably formed of a yielding or pliable material. The valve head is formed of such material that a deposit of sediment of any kind upon the valve seat will not interfere to a serious extent with the proper seating of the valve head to effect a closure of the exhaust opening. The valve head is operated by means of a valve stem which is rigidly secured thereto and pivotally connected to a bell crank arm suitably mounted upon the exhaust tube to permit of actuating the valve head and displacing it from its seat. The valve is normally maintained in closed position by means of a spring which is mounted in engagement with the bell crank arm and its support.

For a better understanding of my invention, reference may be had to the drawing in which a valve 1 is shown comprising an exhaust tube 2 formed of any suitable material, but preferably of metal, so as to obtain strength and rigidity of form. In order to increase the strength of the relatively light weight member 2, a reenforcing spider 3 is secured within the tube by means of rivets 4. The spider 3 is not essential in all cases because the tube 2 may be formed of various materials which insure a light weight structure and, at the same time, possess sufficient strength without the necessity of reenforcement. The tube 2 is formed at its discharge end with an integral bead portion 5 which permits of a close union with a discharge tube 6 which is slipped over the end of the tube 2 and secured thereto by windings of a cable 7 or other suitable material. The opposite end of the tube 2 is formed with an integral flange portion 8 provided with a series of openings and upon which a plurality of annular members 9 and 10 are mounted by means of bolts 11, which are passed through registering openings in the annular members and the flange 8.

Material 12 and a rubber gasket 13 are firmly clamped between the annular members 9 and 10, the material 12 representing the wall of an opening provided in a container, such as a fabric water ballast tank commonly employed in airships. The rubber gasket 13 insures a firm and water tight joint between the various materials. The annular ring or member 9 is preferably provided with an interiorly threaded surface 14 into which a hard rubber seat 15 is fitted, which has an interior surface of proper contour to provide a suitable engaging surface for a valve head 16.

The valve head 16 is formed, at its lower portion, with an arcuate working surface which terminates in a frusto-conical top portion. The entire valve head is preferably formed of a yielding material, such as relatively soft rubber, but the top portion thereof is preferably made with its walls of sufficient thickness and rigidity of form as to yield less readily to pressure than the bottom portion of the valve head. The valve stem 17 is rigidly secured to the valve head by being extended through an opening 18 in the bottom portion of the valve head to the thickened portion of the top, where it is rigidly clamped in position.

In order to provide means for actuating the valve head, a bell crank arm 19 is pivotally mounted upon an auxiliary support ing frame 20, which is secured to the discharge tube 2. The bell crank arm 19 is pivotally connected at one end to the valve stem 17, as indicated at 21, and is engaged by a spring 22 which is mounted about the pivot point of the arm and engages the arm and its supporting bracket 20, a slot 23 being provided in the arm 19 to insure the spring being maintained in proper position. The spring 22 tends to always maintain the valve head firmly in engagement with its seat 15, consequently preventing discharge of the liquid from the container to which the valve is attached.

The operation of the above described valve will be apparent from an examination of the drawings, but it may be stated that in order to open the valve and, consequently, to discharge liquid from the container to which it is attached, the free end of the bell crank arm 19 is pulled away from its position adjacent the discharge tube 2 against the action of a spring 22, thus causing the valve stem 17 to lift the valve head 16 from its seat to a sufficient extent to permit a quick discharge of the entrapped liquid. The discharge tube 6, secured to the valve, is not essential to the structure of the valve but it is utilized in most instances to provide a relatively long discharge passage so that the water ballast may be discharged, for example, from an airship, without any inconvenience to occupants of the airship's car or to danger of the water becoming discharged upon apparatus which would be injured thereby.

The particular construction of the valve head and its seat are of first importance in the valve above set forth since they are formed of non-corrosive material and, at the same time, provide a firm engagement between the parts under all circumstances and, therefore, secure efficient operation. Since the valve head and its seat are not effected by corrosive action of chemicals apt to be contained in the water, they are always readily disengaged to permit a quick discharge of water ballast at all times throughout the life of the valve and this, of course, is of paramount importance in airship navigation.

Although I have shown and described, in particular detail, a valve constructed in accordance with my invention, it is obvious that minor changes may be made in the construction of the valve and in the selection of materials therefor without departing from the spirit or scope of my invention and I desire, therefore, that no limitations shall be imposed except such as are indicated in the appended claims.

What I claim is:

1. A valve comprising a seat of hard rubber, a valve head formed of pliable material adapted to engage the seat, means for displacing the valve head from its seat, said means including a valve stem rigidly secured to the valve head and a bell crank arm pivotally connected to the valve stem and a spring mounted to engage the bell crank arm and tending to always maintain the valve in closed position by reason of such engagement.

2. A valve comprising a discharge tube, an annular member secured thereto having a threaded interior surface, a hard rubber seat screwed into the member, a valve head of pliable material adapted to engage the seat, a valve stem rigidly secured thereto, a bell crank pivotally mounted on the discharge tube and pivotally connected to the valve stem and a spring mounted to engage the bell crank arm and its support.

3. A valve comprising a discharge tube, a plurality of annular members adapted to secure the walls of a discharge opening of a container between them mounted upon the discharge tube, one of said members having an interiorly threaded surface, a hard rubber annular seat screwed into the threaded member, a valve head of pliable material adapted to engage the seat, a valve stem rigidly secured to the valve head, a bell crank arm pivotally secured to the valve stem and pivotally mounted upon the discharge tube and a spring mounted to engage the bell crank arm and its support tending to always maintain the valve in closed position.

In witness whereof, I have hereunto signed my name in the presence of two subscribing witnesses.

MINARD C. HOSKIN.

Witnesses:
J. A. WACKER,
J. E. KEATING.